(12) United States Patent
Lohmann

(10) Patent No.: US 8,950,814 B2
(45) Date of Patent: Feb. 10, 2015

(54) COMPLIANT HEADREST SYSTEM

(75) Inventor: Marcus Lohmann, Köln (DE)

(73) Assignee: Ford Global Technologies, LLC, Dearborn, MI (US)

( * ) Notice: Subject to any disclaimer, the term of this patent is extended or adjusted under 35 U.S.C. 154(b) by 86 days.

(21) Appl. No.: 13/251,339

(22) Filed: Oct. 3, 2011

(65) Prior Publication Data

US 2012/0080927 A1  Apr. 5, 2012

(30) Foreign Application Priority Data

Oct. 4, 2010 (DE) .......................... 10 2010 041 898

(51) Int. Cl.
| | | |
|---|---|---|
| A47C 7/36 | (2006.01) |
| B60N 2/48 | (2006.01) |
| B60N 2/30 | (2006.01) |

(52) U.S. Cl.
CPC ............ B60N 2/4832 (2013.01); B60N 2/3009 (2013.01); B60N 2002/4891 (2013.01)
USPC ............................. 297/410; 297/234; 297/238

(58) Field of Classification Search
CPC ...... B60N 2/4817; B60N 2/3084; A47C 9/08; A47C 1/037
USPC ................................... 297/410, 238, 234, 61
See application file for complete search history.

(56) References Cited

U.S. PATENT DOCUMENTS

| | | | | |
|---|---|---|---|---|
| 5,466,043 | A | * | 11/1995 | Lambert et al. ................ 297/238 |
| 5,700,054 | A | * | 12/1997 | Lang .............................. 297/238 |
| 5,938,279 | A | * | 8/1999 | Schubring et al. ........ 297/216.12 |
| 8,322,790 | B2 | * | 12/2012 | Tscherbner .................... 297/408 |
| 2006/0071529 | A1 | * | 4/2006 | Yetukuri et al. .......... 297/411.32 |
| 2007/0069561 | A1 | * | 3/2007 | Schnabel et al. .............. 297/238 |
| 2010/0013275 | A1 | * | 1/2010 | Yokota et al. ................... 297/61 |
| 2012/0056451 | A1 | * | 3/2012 | Tscherbner ..................... 297/61 |

FOREIGN PATENT DOCUMENTS

DE  102004027385 A1  12/2005

* cited by examiner

Primary Examiner — David R Dunn
Assistant Examiner — Alexander Harrison
(74) Attorney, Agent, or Firm — Vichit Chea; Price Heneveld LLP

(57) ABSTRACT

A backrest for a vehicle includes a head restraint which can be adjusted to a higher position. The head restraint includes a head part and a support, which is guided displaceably in the backrest, for the head part being transferable from a use region, which is delimited by an upper use position and a lower use position, into a lower not-in-use position in which the backrest is blocked by an interfering structure against use, wherein the support triggers the interfering structure upon transfer of the head restraint into the lower not-in-use position.

14 Claims, 7 Drawing Sheets

COMPLIANT HEADREST SYSTEM

FIELD OF THE INVENTION

The invention relates to a backrest for a vehicle with a head restraint which can be adjusted to a higher position, the head restraint having a head part and a support, which is guided displaceably in the backrest, for the head part and being transferable from a use region, which is delimited by an upper use position and a lower use position, into a lower not-in-use position in which the backrest is blocked by an interfering structure against use.

BACKGROUND OF THE INVENTION

Vehicle seats and backrests are generally found in vehicles to support passengers traveling in the vehicle. The adjustability and functionality of the seats and backrests typically provides comfort and at the same time increases the safety of the passengers.

SUMMARY OF THE INVENTION

According to one aspect of the present invention, a backrest for a vehicle includes a head restraint, which can be adjusted to a higher position. The head restraint includes a head part and a support, which is guided displaceably in the backrest, for the head part being transferable from a use region, which is delimited by an upper use position and a lower use position, into a lower not-in-use position in which the backrest is blocked by an interfering structure against use, wherein the support triggers the interfering structure upon transfer of the head restraint into the lower not-in-use position.

According to another aspect of the present invention, a backrest for a vehicle includes a support slidably received in the backrest. A head restraint is coupled to the support and is moveable between upper use, lower use, and stowed positions. An interfering structure defines a portion of the backrest and is moveable between blocked and unblocked positions. The support triggers movement of the interfering structure to the blocked position when the head restraint moves to the stowed position, which forces the interfering structure outward.

According to yet another aspect of the present invention, a backrest for a vehicle includes a vertically slidable support. A multi-piece head restraint is coupled to the support and is moveable between upper use, lower use, and stowed positions. An interfering structure defines a portion of the backrest and is moveable between blocked and unblocked positions. The support forces the interfering structure outward when moving to the stowed position, and does not force the interfering structure outward when in the upper use position.

DETAILED DESCRIPTION OF EMBODIMENTS

Figure 1:
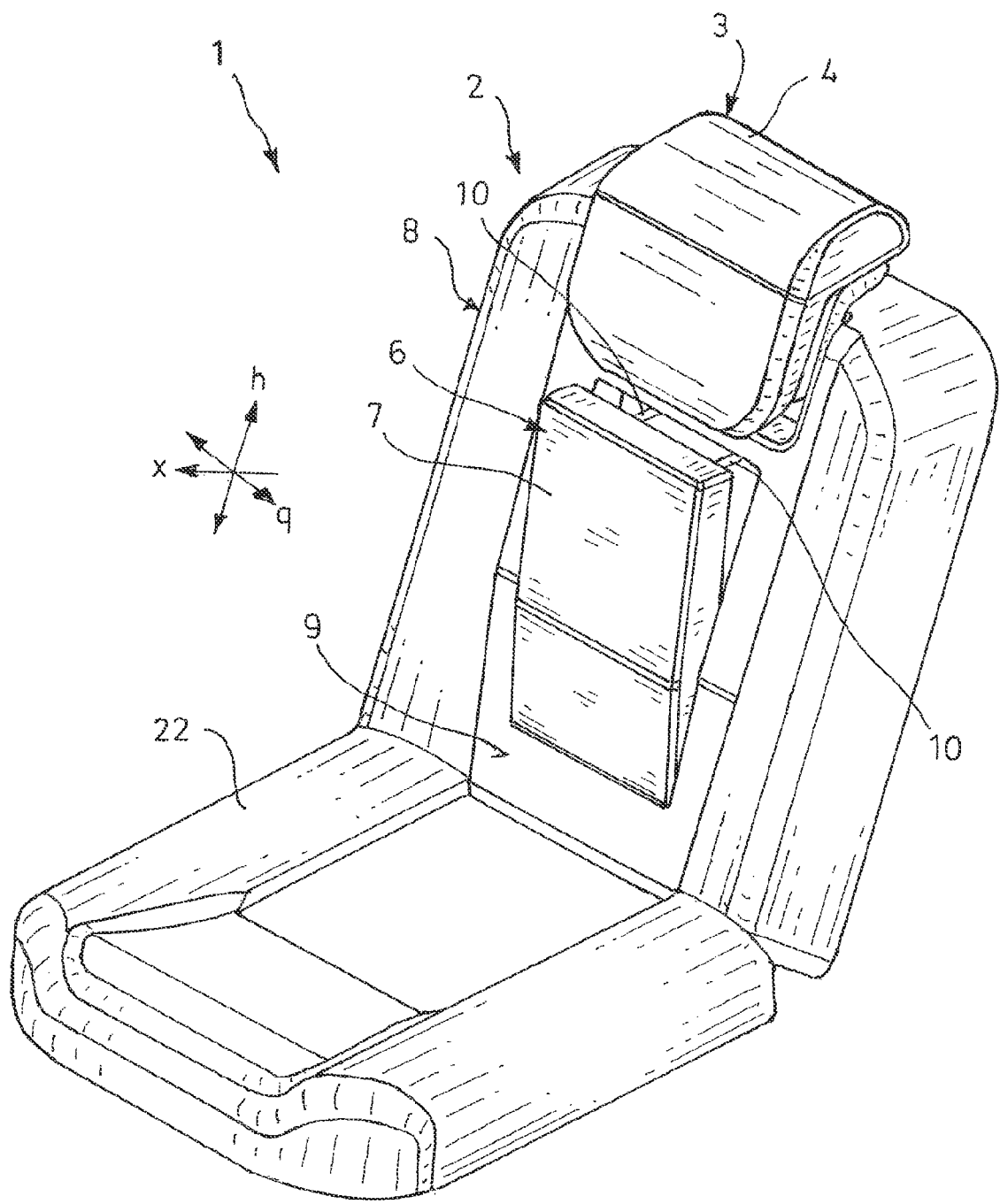
FIG. 1 shows a perspective top view of a vehicle seat with a backrest, with a head restraint in a lower not-in-use position.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawing, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The support of the head part is functionally necessarily of mechanically stable design and is guided in the backrest in a mechanically stable manner. It therefore has greater strength and lower flexibility than the head part, which is generally padded. As a consequence of the functionally necessarily stable guidance of the support of the head restraint in the backrest, a defined movement path or displacement path of the support out of the upper use position into the not-in-use position is provided. The support can therefore be correspondingly defined and can reliably act on the interfering structure. In comparison to the triggering of the actuation of the interfering structure via the padded head part, as described in the prior art, the support and interfering structure forms a mechanically substantially more stable system.

In order to produce the interfering structure, a component can be brought into an interfering position in which said component, for example, protrudes over the lean-on surface of the backrest in such a manner that correct use or comfortable, interference-free leaning of a user on the lean-on surface is prevented. The leaning-on of a user is customarily defined via a "torso line" of the user, in which the user, during correct use, rests with his back against the backrest in such a manner that the back is supported in a planar manner on the backrest. By means of the interfering structure, for example in the form of elevations or excess lengths in the direction of extent away from the lean-on surface, the torso line of the user, in which the user is supported on the backrest via the interfering structure, can be pivoted through an angle in the direction of extent in such a manner that said user, for example with his back from the pelvis towards the head, is spaced apart further from the backrest and touches the head part at most by severely bending his back. This angle may be greater than or equal to 10 degrees.

In the case of compact cars, the backrest can be reduced in size in the not-in-use or stowed position in such a manner that it can be folded over without striking with the head restraint against the backrests of the front seats or even becoming jammed.

The support can therefore be kinematically coupled reliably and reproducibly at a point of the movement path thereof, or via a defined segment, which is designed as an actuating path, of the movement path thereof, to a designated component or a plurality of designated components of the interfering structure in the form of an interfering path such that the component or the components can be brought via the interfering path from the normal position into an interfering position with the interfering structure being formed. The triggering of the interfering structure can occur via at least one path segment of the displacement path of the head restraint between the lower use position and the lower not-in-use position. In addition, as further explained below, in the not-in-use position of the head restraint, the interfering structure can be held in a stable manner in the interfering position by the dynamic action of the support.

The support can have a supporting linkage with at least one elongate supporting element, which is guided displaceably in the vertical position in the backrest. The supporting element may be a tubular profile.

In order to trigger the interfering structure, a coupling system can be provided between the support and interfering structure. The coupling system can be configured to transmit that segment of the movement path of the support which is designed as the actuating path to the component or the components of the interfering structure in the form of the interfering path, via which the component or the components can be moved from the normal position into the interfering position with the interfering structure being formed. The interfering path can involve at least one path component in the direction of extent perpendicularly away from a front lean-on surface of the backrest. The coupling system is completely integrated in the backrest at least whenever the head restraint, with regard to the vertical adjustment thereof, is in the use region.

The coupling system may be designed as a gearing, such as toothed gearing or belt gearing. As an alternative, the coupling system may be designed as a system which acts in a wedge-like manner and has sloping planes along which the support and/or the component or the components of the interfering structure slide in order to transfer the actuating path into the interfering path with the interfering structure being formed.

In one embodiment of the backrest, the coupling system can be designed as a cam mechanism with a disk cam. The disk cam can be mounted rotatably about an axis of rotation perpendicularly to the vertical adjustment of the head restraint and parallel to a lean-on surface of the backrest. The disk cam can have two curved side surfaces. The latter can run in the direction of the axis of rotation of the disk cam. They can be arranged circumferentially with respect to the axis of rotation. The support can act dynamically in the direction of the vertical adjustment by sliding or rolling along one of the curved side surfaces of the disk cam. The other curved side surface of the disk cam can act dynamically directly on the component, moving same over the interfering path. The disk cam can be designed as a triangular disk cam.

In another embodiment of the backrest, the coupling system can have a lever arrangement, which can act dynamically on the interfering structure. A lever arrangement of this type can be constructed and mounted in a mechanically uncomplicated manner and can permit a transmission of force in a mechanically reliable manner. In addition, force can be stepped up in a structurally simple manner. The lever arrangement can act on the interfering structure directly or via an application of force. The interfering path is greater than the path segment of the displacement path of the head restraint. The lever arrangement can be completely integrated in the backrest, at least in the normal position of the interfering structure.

In order to produce the interfering structure, it is possible, for example, to provide an additional component, such as a bolt, pin, roller, or bow, which, upon movement of the head restraint into the not-in-use position, at least partially protrudes over the lean-on surface in the interfering position. A subsection of the lean-on surface of the backrest and/or of the upholstery of the backrest is provided for the interfering structure. The subsection can be designed such that it can be transferred from a normal position, in which the subsection is integrated in the lean-on surface, into the interfering position, in which the subsection at least partially protrudes over the lean-on surface in a direction of extent away from the lean-on surface.

The lever arrangement can have a tilting lever, which is mounted pivotably about a first pivot axis perpendicularly to the vertical adjustment and to the direction of extent. A mounting provided for the tilting lever can be fixed on a provided guide body for guiding the support in the backrest. The tilting lever can have a power arm, which can be connected to the supporting element dynamically and in a manner remaining loose at least over the path segment of the displacement path of the head restraint between the lower use position and the lower not-in-use position. The tilting lever can have a work arm for transmitting force to the interfering structure, which work arm is designed to be larger than the power arm. The actuating path can therefore be transmitted via the lever arrangement in enlarged form to the interfering path. The work arm can furthermore be coupled or connected dynamically and in a manner remaining loose to the interfering structure or to the component for producing the interfering structure at least over the path segment of the displacement path of the head restraint.

The work arm and power arm can enclose an angle greater than zero. This angle may be greater than 60 degrees, greater than 75 degrees, and ideally at least approximately 90 degrees. At an angle of 90 degrees, the path segment of the displacement path during the lowering of the head restraint can be transferred into an interfering path running away from the lean-on surface in the direction of extent.

The supporting element or the tubular profile can have a lower end which, remaining loose below the lower use position, acts on the upper side on the power arm of the tilting lever. At the moment of the first contact of the tilting lever with the supporting element during the lowering of the head restraint under the lower use position, the tilting lever can be arranged in a first position in which the power arm is arranged at least approximately perpendicularly or at an acute angle to the vertical adjustment. In this case, force does not act on the interfering structure, the component or components of which are in the normal position, whereas, when the supporting element or the tubular profile is lowered downward, the tilting lever can be pivoted, by the power arm thereof being pressed down, through a pivot angle within the range of greater than zero degrees to less than 90 degrees, through approximately 60 degrees to 80 degrees, into a second position. In the second position, the load arm can be arranged at least virtually perpendicularly to the vertical adjustment. In the second position of the tilting lever, the component or the components are moved or pivoted out of the backrest into the interfering position with the interfering structure being formed.

The subsection of the lean-on surface of the backrest or of the upholstery of the backrest can be arranged so as to be pivotable about a second pivot axis at least approximately parallel to the lean-on surface and to the first pivot axis by an angle out of the lean-on surface. The second pivot axis can be arranged on a lower side of the subsection. The angle can be approximately 10 degrees.

The lower end of the supporting element or of the tubular profile can be rounded or beveled to form a sloping pane. As a result, the lower end can more easily slide along the tilting lever. The sloping plane can point towards the tilting lever. The power lever can have an engagement surface for the supporting element. In the lower use position, the engagement surface can point at least with a relatively large directional component in the displacement direction and towards the padded part. To more securely couple the supporting element to the tilting lever, the engagement surface can be designed to be larger than the cross section of the supporting element.

Even before the not-in-use position is reached, the interfering structure can have been completely transferred into the interfering position thereof. In this case, the tilting lever can be held, by the power arm thereof resting laterally with respect to the vertical adjustment and remaining loose, on the supporting element, in the second position of the tilting lever, in which the tilting lever holds the interfering structure in the interfering position thereof. In the second position, the tilting lever can be pressed laterally by the power arm thereof against the supporting element via the deadweight of the unfolded interfering structure.

The supporting linkage can have two supporting elements, which are arranged spaced apart from each other at least approximately in parallel and are guided displaceably in the vertical adjustment in the backrest. The supporting elements lie in a plane which is arranged at least approximately parallel to the lean-on surface or which is arranged perpendicularly to the direction of extent. Furthermore, the lever arrangement can have at least two identically acting tilting levers. In this case, each supporting element can be assigned a tilting lever. Upon transfer of the head restraint in the direction of the not-in-use position beyond the lower use position thereof, the supporting element can act dynamically on the lower side on the tilting lever assigned thereto. The work arms of the tilting lever can be fixedly connected, integrally to each other via a transverse web with a bow being formed. Synchronous engagement of the work arms on the interfering structure can therefore be obtained in a structurally simple manner.

Figure 2:
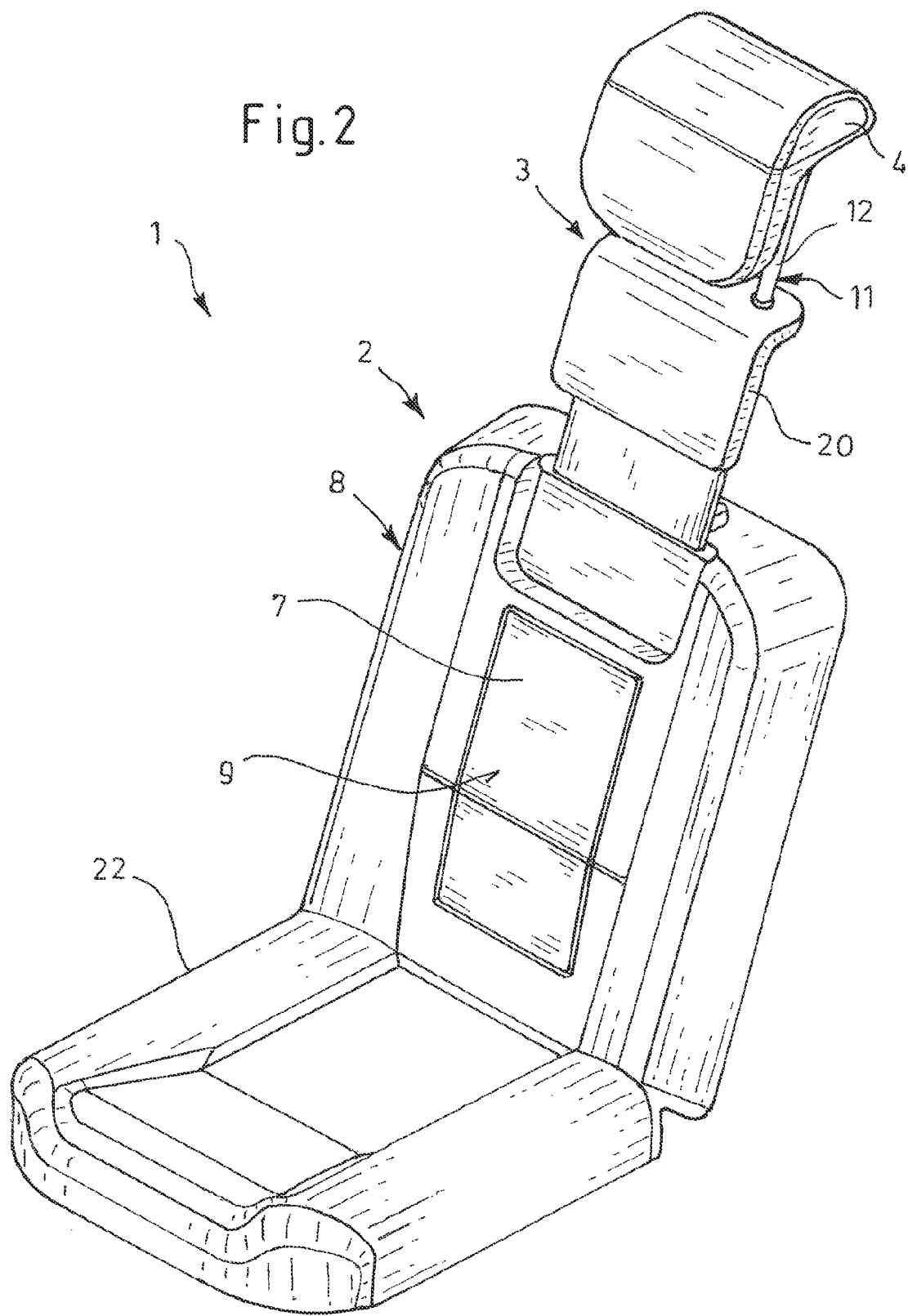
FIG. 2 shows a perspective view of the vehicle seat according to FIG. 1, but with the head restraint in a lower use position.
Figure 3:
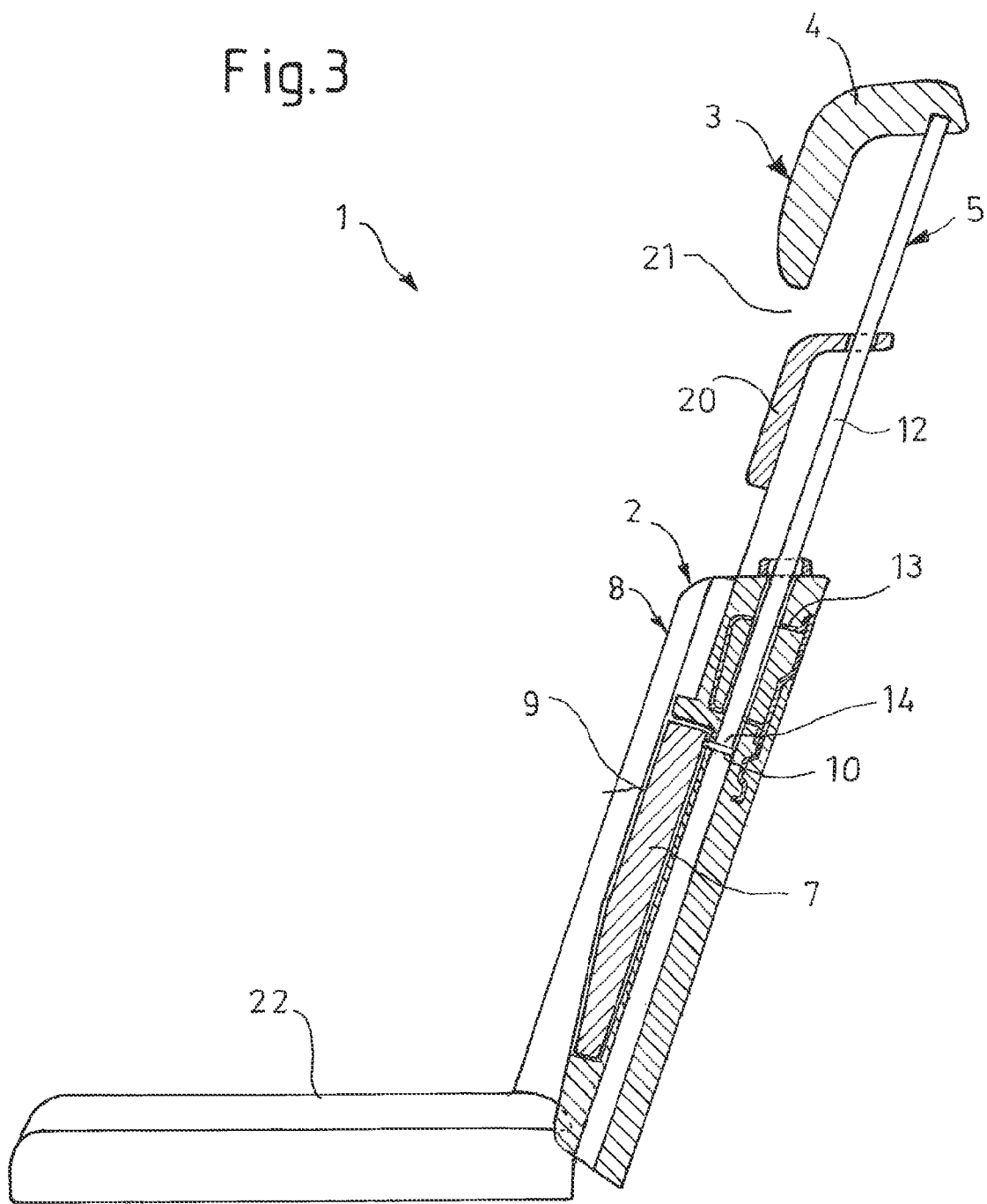
FIG. 3 shows a longitudinal sectional view of the vehicle seat according to FIG. 2.
Figure 4:
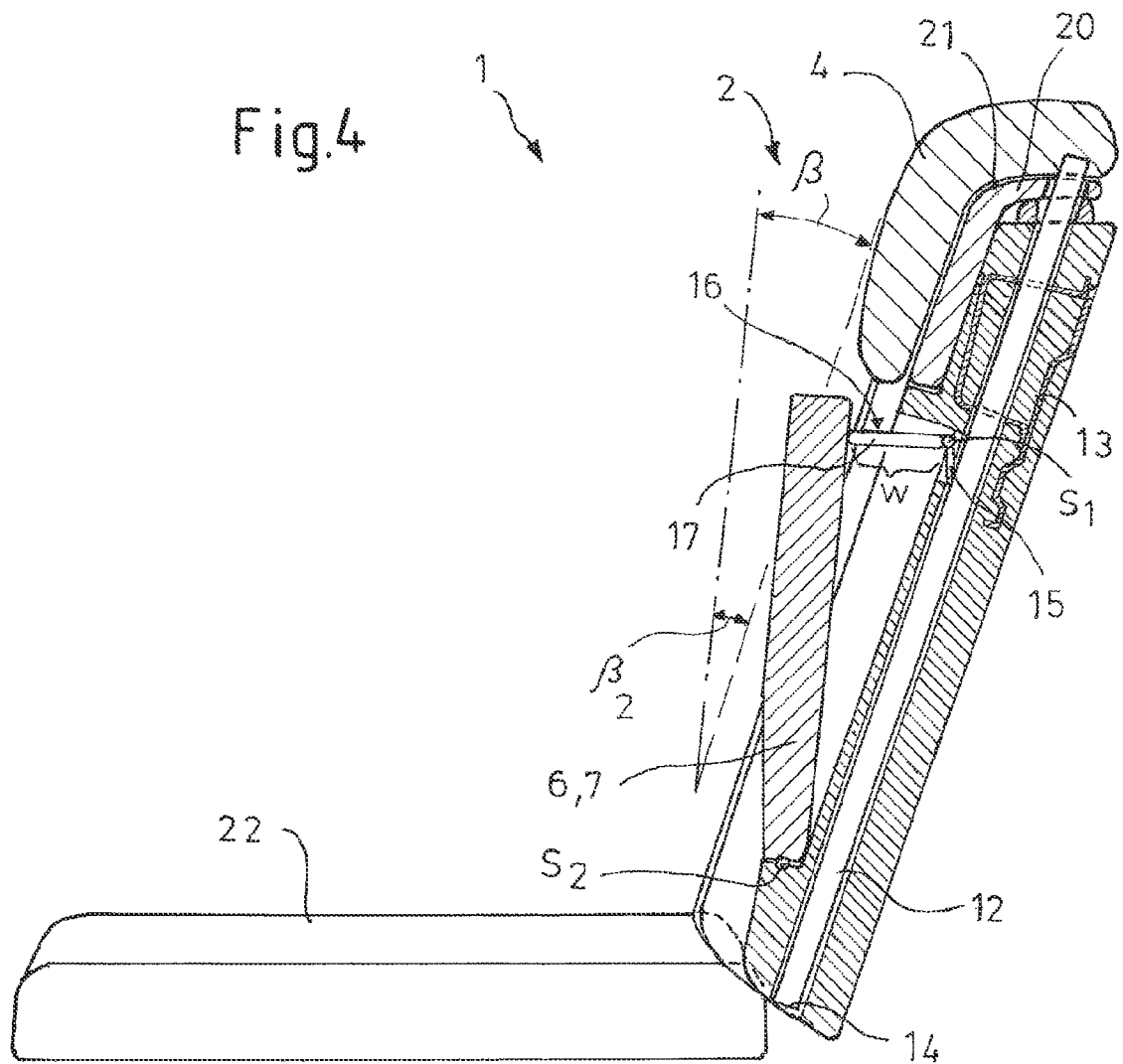
FIG. 4 shows a longitudinal sectional view of the vehicle seat according to FIG. 1.
Figure 5:
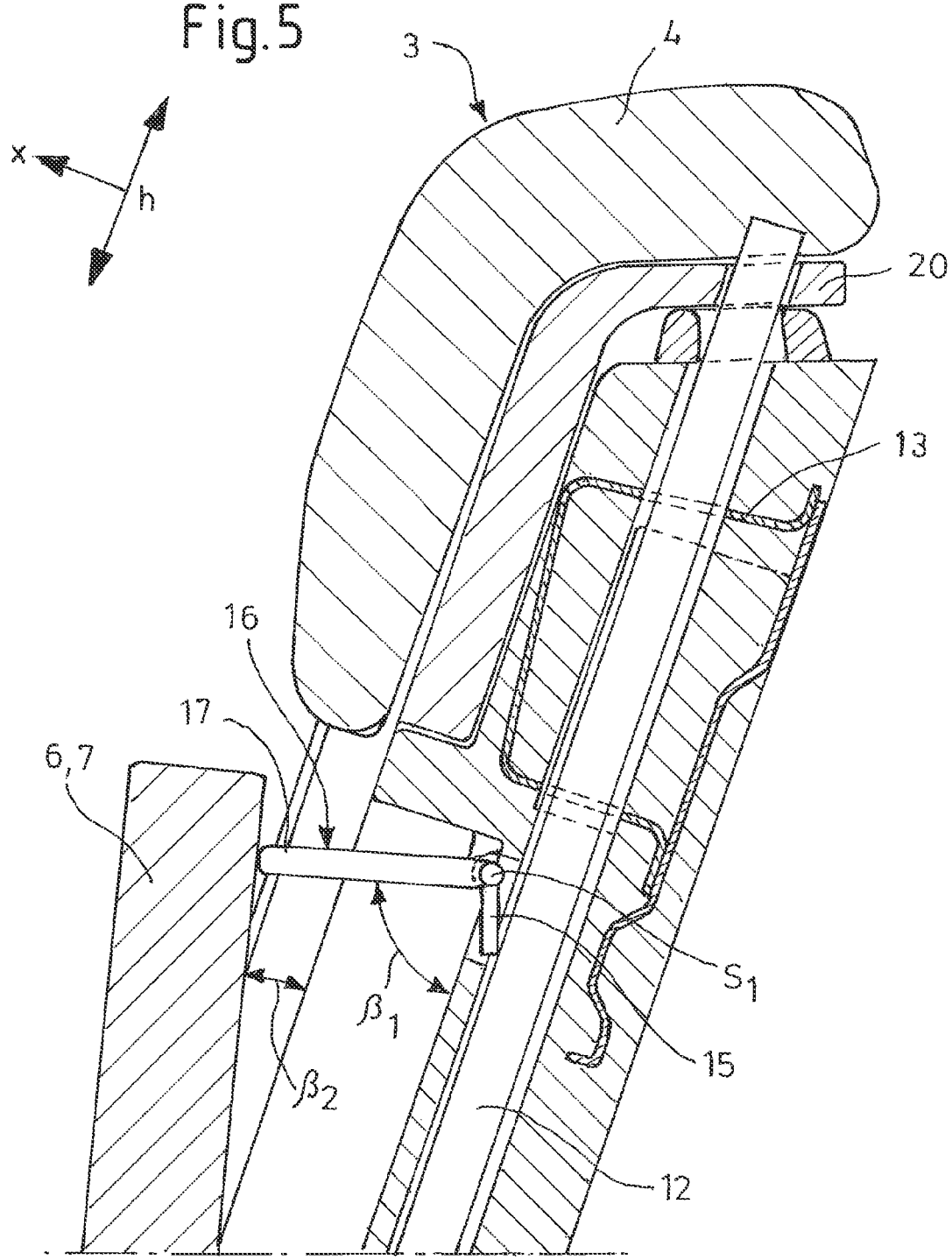
FIG. 5 shows an enlargement of the detail VI according to FIG. 4.
Figure 6:
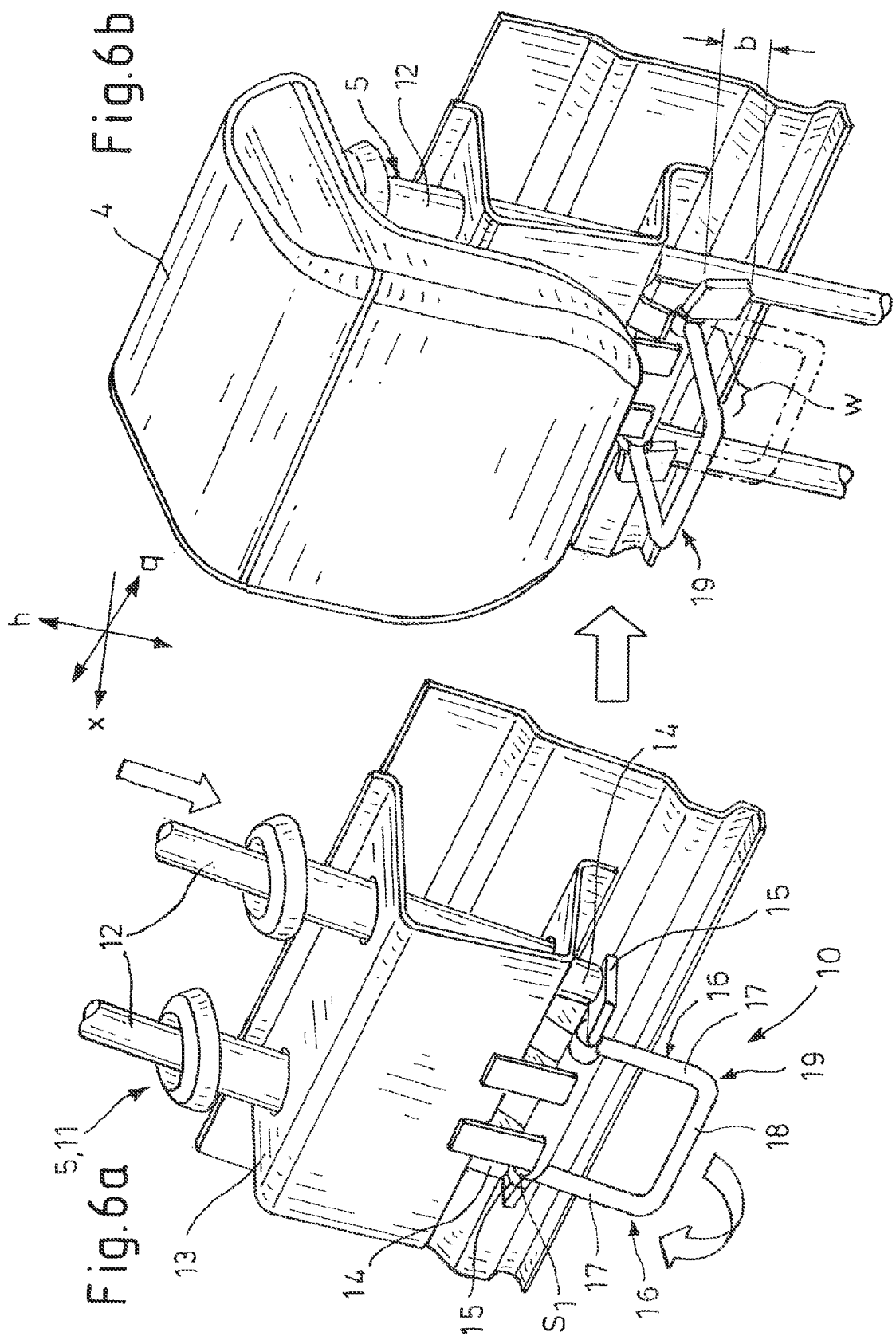
FIGS. 6a and 6b show a perspective partial illustration of the backrest with the head restraint in the lower use position and in the lower not-in-use position, respectively.

FIGS. 1-7 reproduce, in various views and partial illustrations, a car seat 1 with a backrest 2 for a vehicle). The backrest 2 has a head restraint 3, which can be adjusted to a higher position and has a head part 4 (also referred to as a top head part) and a support 5, which is guided displaceably in the backrest 2, for the head part 4. The head restraint 3, which can be adjusted to a higher position, can be transferred from a use region, which is delimited by an upper use position and a lower use position, into a lower not-in-use (stowed) position. In FIGS. 2, 3, and 6a, the head restraint 3 is in each case in the lower use position. In FIGS. 1, 4, 5, 6b, and 7, the head restraint 3 is in each case in the lower not-in-use position. The lower not-in-use position is characterized in that the backrest 2 is blocked against correct use of the backrest 2 by a user by an interfering structure 6. For this purpose, as is clearly apparent in FIGS. 1 and 2, a subsection 7 of an upholstery 8 of the backrest 2 can be transferred from a normal position (FIG. 2), in which the subsection 7 is integrated in a lean-on surface 9 of the backrest 2, into an interfering position (FIG. 1), in which the subsection 7 is unfolded in the direction of extent x away from the lean-on surface 9 so as to protrude over the latter. According to the invention, the support 5 triggers the interfering structure 6 upon transfer of the head restraint 3 into the lower not-in-use position.

In the exemplary embodiment shown, the support 5 acts dynamically on the end side on the interfering structure 6 via a lever arrangement 10. The support 5 here has a supporting linkage 11 with two tubular supporting elements 12, which are arranged spaced apart from each other in parallel. The supporting elements 12 are guided displaceably in the vertical adjustment h in the backrest 2 in a guide 13, which is anchored in the backrest 2.

Upon leaving the lower use position in the direction of the not-in-use position, the supporting elements 12 each engage dynamically at a lower end 14 on a power arm 15 of a tilting lever 16, which is arranged pivotably about a first pivot axis s1 perpendicularly to the vertical adjustment h, and approximately parallel to the lean-on surface 9.

The tilting lever 16 has a work arm 17 arranged here approximately at an angle of 90 degrees to the power arm 15. The work arms 17 of both tilting levers 16 are connected integrally to each other via a transverse web 18 with a bow 19 being formed. As a result, upon engagement of the supporting elements 12 by the latter being lowered, the two tilting levers 16 are pivoted synchronously and act together via the bow 19 on the subsection 7 of the upholstery 8. In this case, the tilting levers 16 are pivoted from a first position, in which the respectively assigned supporting element 12 is ineffective in terms of movement in the lower use position for the tilting lever 16 and, remaining loose, acts on the upper side on the power arm 15 of the tilting lever 16, about a first pivot angle β1 of approximately 90 degrees downward and forward into a second position. In the second position, the subsection 7 is unfolded about the second pivot axis s2 in the direction of extent x in a second pivot angle β2 of approximately 10 degrees away from the lean-on surface 9 in a manner protruding over the latter into the interfering position. The second pivot axis s2 is arranged here on a lower side of the subsection 7.

For example, FIG. 2 shows an additional head part or lower head part 20, which, when the head restraint 3 is extended with respect to the vertical adjustment h between the head part 4 and backrest 2, is, arranged so as to at least partially bridge a gap 21 between the head part 4 and backrest 2. As is apparent in FIGS. 4 and 5, in the lower not-in-use position of the head restraint 3, the additional head part 20 is pushed together with the head part 4 in such a manner that it is arranged between the head part 4 and backrest 2, the head part 4 and additional head part 20, which each have a similarly curved longitudinal sectional profile, bearing against each other. As shown purely schematically in the figures, the additional head part 20 is arranged on the supporting elements 12 and is extended when the head part 4 is extended.

In the lower not-in-use position, the head part 4 is therefore lowered downward to an extent such that it is arranged substantially in front of the lean-on surface 9 and is virtually completely integrated with respect to the direction of extent x into the upholstery 8 of the backrest 2. The rearward view of a driver is therefore not obstructed in practice by the head restraint 3 of the backrest 2, according to the invention.

Figure 7:
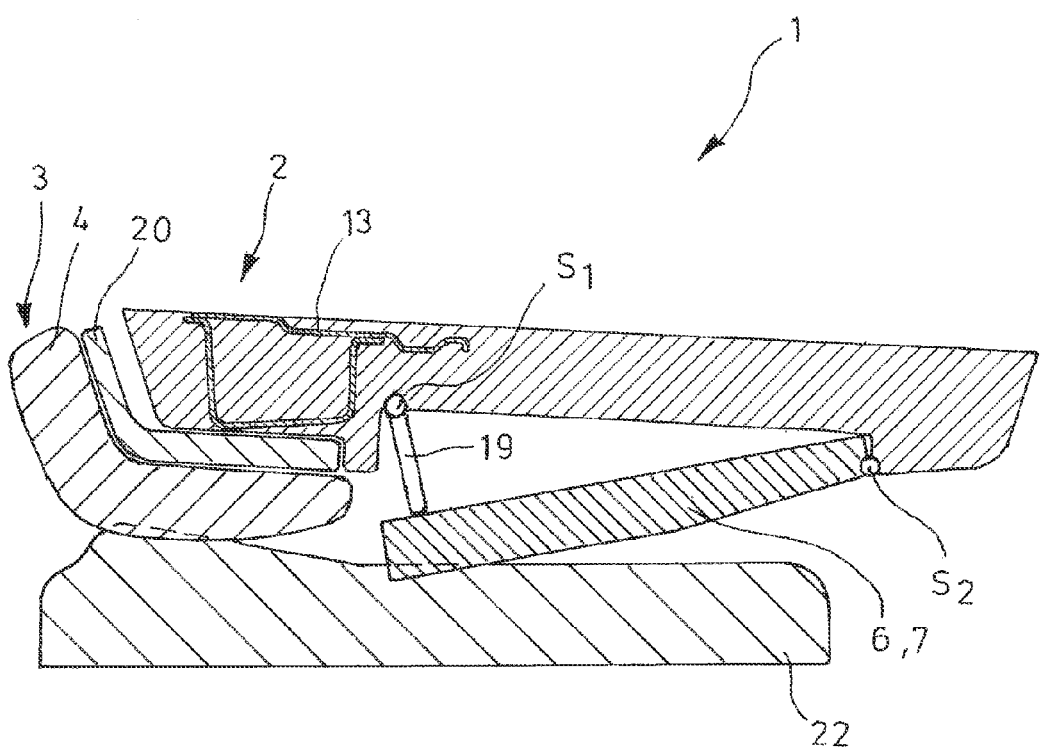
FIG. 7 shows a perspective top view of the vehicle seat with the backrest folded over.

Furthermore, the backrest 2 is reduced in size with respect to the extent thereof in the vertical adjustment h in such a manner that, as shown schematically in FIG. 7, the backrest 2, which is folded downward against a seat part 22 of the vehicle seat 1, protrudes together with the head part 4 of the head restraint 3 horizontally only slightly beyond the seat part 22. This prevents a backrest 1 according to the invention which is provided in a rear seat, upon being folded downward against the seat part 22 of the rear seat, from being able to strike against an associated front seat or become wedged against the same even in vehicles with a relatively small passenger compartment. The interfering structure 6 here is designed in such a manner that the backrest 2 can be folded downward without the unfolded cushion part 7 obstructing the folding downward of the backrest 2.

It is to be understood that variations and modifications can be made on the aforementioned structure without departing from the concepts of the present invention, and further it is to be understood that such concepts are intended to be covered by the following claims unless these claims by their language expressly state otherwise.

I claim:

1. A backrest for a vehicle comprising:
   a lean-on surface having a subsection of the backrest defining an interfering structure movable between a blocked position and an unblocked position;
   a head restraint which can be adjusted to a higher position, the head restraint comprising:
   a head part and a support slidably received in the backrest, the head part being transferable from a use region, which is delimited by an upper use position and a lower use position, into a lower not-in-use position, wherein the support simultaneously moves the interfering structure forward relative to the lean-on surface upon transfer of the head part into the lower not-in-use position; and
   a lever arrangement between the interfering structure and the support configured to project forward relative to the lean-on surface of the backrest to force the interfering structure forward to the blocked position when the head part moves from the lower use position to the lower not-in-use position and simultaneously moves the support vertically within the backrest to act dynamically on the lever arrangement, wherein the interfering structure maintains the blocked position when the backrest is in a folded position proximate a seat cushion.

2. The backrest of claim 1, wherein the lever arrangement has a tilting lever which is mounted pivotably about a first pivot axis transversely with respect to the vertical adjustment and has a power arm and a work arm arranged at an angle greater than zero with respect to each other, the power arm being dynamically connected to the supporting element and the work arm being dynamically connected to the interfering structure, at least over the segment of the displacement path of the head restraint.

3. The backrest of claim 2, wherein the power arm and work arm enclose an angle of at least approximately 90 degrees.

4. The backrest of claim 2, wherein the supporting element has a lower end which, remaining loose below the lower use position, acts on the upper side on the power arm of the tilting lever, the power arm in a first position being arranged at least approximately perpendicularly to the vertical adjustment and, by the tilting lever being pivoted about a first pivot angle within the range of greater than zero degrees to less than 90 degrees, being pressed downward and forward into a second position.

5. The backrest of claim 2, wherein the work arm includes first and second portions fixedly connected to each other via a transverse web, with a bow being formed.

6. The backrest of claim 4, wherein in order to produce the interfering structure, a subsection of the front lean-on surface of the backrest or of an upholstery of the backrest can be transferred from a lean-on position, in which the subsection is integrated in the lean-on surface or in the upholstery, into an interfering position in which said subsection at least partially protrudes over the lean-on surface in the direction of extent away from the front lean-on surface.

7. The backrest of claim 2 further comprising:
   a subsection that defines a padded part of the backrest which, in order to produce the interfering structure, can be pivoted out about a second pivot axis at least approximately parallel to the lean-on surface and to the first pivot axis, the second pivot axis being arranged on a lower side of the subsection.

8. A vehicle backrest comprising:
   a support slidably received in the backrest;
   a head restraint having independently movable and vertically adjustable top and lower head parts coupled to the support;
   an interfering structure defining a portion of the backrest; and
   where lowering of the support backrest acts on a lever arrangement that projects forward relative to a backrest lean-on surface, and forces a top portion of the interfering structure outward to a blocking position.

9. The backrest of claim 8, wherein the top head part and lower head part are substantially horizontally aligned when the head restraint is in the stowed position and wherein the top head part is disposed above the lower head part when the head restraint is in an upper use position.

10. The backrest of claim 8, wherein the lever arrangement includes a tilting lever that communicates with the support.

11. The backrest of claim 10, wherein the tilting lever includes a power arm in communication with the support and a work arm in communication with the interfering structure.

12. The backrest of claim 8, wherein the interfering structure is pivotally connected to the backrest.

13. The backrest of claim 8, wherein the support includes a supporting linkage with at least one elongate supporting element that is vertically adjustable in the backrest.

14. A vehicle backrest comprising:
   a head restraint having independently movable top and lower head parts coupled to a support and vertically adjustable downward to a stowed position;
   an interfering structure defining a portion of the backrest; and
   a lever having first and second portions and a transverse web extending therebetween, the lever extending forward of a lean-on surface when the head restraint is in the stowed position, thereby forcing the interfering structure forward no more than approximately 10° relative to the lean-on surface.

* * * * *